United States Patent

[11] 3,616,155

[72] Inventor Marc A. Chavannes
New York, N.Y.
[21] Appl. No. 740,188
[22] Filed June 26, 1968
[23] Division of Ser. No. 336,097, Dec. 26, 1963, Pat. No. 3,405,020
[45] Patented Oct. 26, 1971
[73] Assignee Sealed Air Corporation
The portion of the term of the patent subsequent to July 9, 1985, has been disclaimed.

[54] CELLULAR LAMINATE MADE FROM TWO THERMOPLASTIC SHEETS HAVING POLYVINYLIDENE CHLORIDE COATINGS ON FACING SIDES OF THE SHEETS
2 Claims, 4 Drawing Figs.
[52] U.S. Cl. .................................................. 161/119, 161/122, 161/127, 161/146, 161/160, 161/252, 161/254
[51] Int. Cl. .................................................. B32b 17/34, B32b 27/32, B32b 3/12
[50] Field of Search........................................... 161/119, 127, 131, 154, 122, 254, 256, 146, 160, 252; 229/3.5

[56] References Cited
UNITED STATES PATENTS

| | | | |
|---|---|---|---|
| 2,221,310 | 11/1940 | Gazelle..................... | 161/127 |
| 2,633,442 | 3/1953 | Caldwell.................... | 161/127 |
| 2,872,366 | 2/1959 | Kiernan et al. ............. | 161/254 |
| 2,878,154 | 3/1959 | Cheney et al. ............. | 156/194 |
| 3,026,231 | 3/1962 | Chavannes ................. | 264/92 |
| 3,141,804 | 7/1964 | Kauffeld..................... | 156/257 |
| 3,370,972 | 2/1968 | Nagel et al.................. | 117/7 |
| 3,392,081 | 7/1968 | Chavannes ................. | 161/119 |

FOREIGN PATENTS

| | | | |
|---|---|---|---|
| 908,579 | 10/1962 | Great Britain............... | 161/127 |

Primary Examiner—Harold Ansher
Assistant Examiner—Willard E. Hoag
Attorney—Eugene E. Geoffrey, Jr.

ABSTRACT: An improved cellular product formed of multiply laminates wherein at least one of the laminates is embossed and the other of the laminates seals the embossments, each of the laminates consisting of at least a plastic base material and a gas-impervious coating and wherein at least one of the coatings is protected by the base material.

PATENTED OCT 26 1971 3,616,155

INVENTOR
MARC A. CHAVANNES
BY
ATTORNEY

CELLULAR LAMINATE MADE FROM TWO THERMOPLASTIC SHEETS HAVING POLYVINYLIDENE CHLORIDE COATINGS ON FACING SIDES OF THE SHEETS

This application is a division of application Ser. No. 336,097, filed Dec. 26, 1963, now Pat. No. 3,405,020 entitled METHOD AND APPARATUS FOR THE MANUFACTURE OF PLASTIC LAMINATES AND CELLULAR MATERIALS AND THE RESULTANT PRODUCTS.

This invention relates to laminated and molded plastic materials and more specifically to novel and improved cellular materials formed of plastic sheet laminates.

While plastics, and particularly plastics in sheet form, are used in a great variety of applications, perhaps the largest use is for the packaging of materials since plastics generally offer numerous advantages over paper products. For instance, plastics generally will resist the deleterious effects of moisture and other liquids and gases that damage or destroy paper. The more common plastics used for packaging such as polyethylene and polyvinyl chloride are not entirely satisfactory because they are not entirely impervious to moisture vapor and gases. Certain of the more expensive plastics such as polyvinylidene chloride are substantially impervious to moisture vapor and other gases but are costlier and heavier in weight. The fabrication of cellular products from plastics such as polyethylene and polyvinyl chloride with the more impervious plastics such as polyvinylidene chloride enables the use of very thin layers of the impervious plastic which can, in accordance with the invention, be placed in a protected position. In this way, the resultant product is relatively inexpensive and at the same time a substantially gas-impervious structure is provided.

In cases wherein plastics having relatively low melting points are coated with a thin layer of polyvinylidene chloride or a copolymer containing polyvinylidene chloride, the invention contemplates a novel and improved laminated product wherein the saran being disposed between outer layers of another plastic one of which may be embossed prior to the lamination. In these cases, the polyvinylidene chloride is fully protected against abrasion and at the same time is prevented from attacking and corroding certain metals and other materials. By having the polyvinylidene chloride contained wholly within the plastic product, there is provided a relatively inert packaging material that is substantially impervious to gases and moisture vapor, has improved strength, and at the same time can be fabricated at relatively low cost.

A further object of the invention resides in the provision of a novel and improved cellular material fabricated of plastic laminates each having two or three layers of plastic material. In the case of the two-layer laminate, either of the layers can be sealed to a corresponding layer of another laminate in the fabrication of a cellular material and other similar products.

A still further object of the invention resides in the provision of a novel and improved cellular material that is characterized by its increased imperviousness to gases and its relative inertness.

The above and other objects and advantages of the invention will become more apparent from the following description and accompanying drawings forming part of this application.

Figure 1:
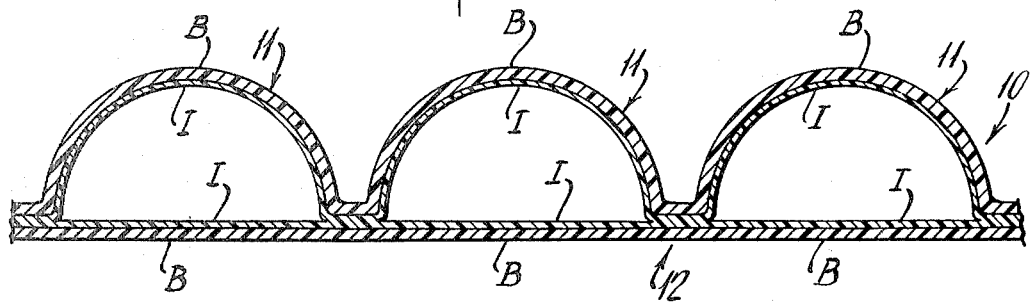
FIG. 1 is a cross-sectional view of one embodiment of cellular material in accordance with the invention.

The improved products in accordance with the invention are illustrated in FIGS. 1 through 4 and in each case the base material which has been coated is denoted by the letter B while the coating is denoted by the letter I. More specifically and with reference to FIG. 1, the base material B of the embossed layer 10 has a layer of a substantially gas impervious material I on the inner side thereof. Each embossment 11 in the layer 10 is a discrete embossment and the embossments are generally distributed uniformly over the surface of the layer 10. The embossments 11 are sealed by a second layer 12 wherein the base B is also coated by a substantially gas-impervious plastic I and the meeting layers I surrounding each cell 11 form a substantially homogeneous structure.

The gas-impervious coatings I shown in FIG. 1 may comprise a combination of polyvinylidene chloride and acrylonitrile and copolymers though other suitable materials including fluorocarbons may be used provided however that they will afford a good seal. The base material may include plastics such as polyethylene, polyvinyl chloride, polypropylene, nylon, cellulose acetate, polystyrene and others. For convenience in illustration the base material and coatings have been illustrated in enlarged form though in actual practice the base material may be of any suitable thickness of the order of 1 to 3 mils and even greater while the coating may be of the order of 0.1 mil. In some instances a primer may be utilized beneath the coating which may be of any suitable composition as for instance a polyvinylidene dispersion containing a partially polymerized resin and about 40 percent solids such as colloidal silica.

Figure 2:
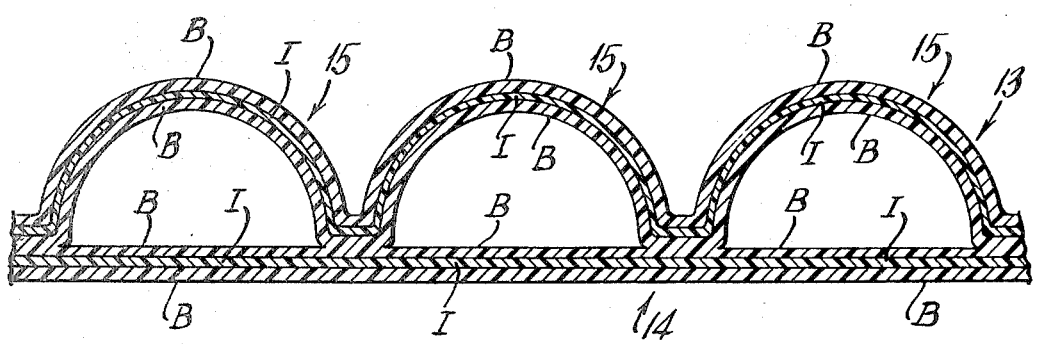
FIG. 2 is a modified embodiment of a cellular material in accordance with the invention and utilizing two three-ply laminates.

FIG. 2 is a modified embodiment of a cellular material in accordance with the invention which embodies two three-ply layers 13 and 14 with each three-ply layer consisting of outer sheets of the base material B and an intermediate layer I which is formed by sealing the coatings of the layers B one to the other to form the intermediate homogeneous structure. As in the case of the preceding embodiment of the invention, the three-ply layer 13 is embossed to provide a plurality of discrete cells 15. The sealing layer 14 is of three-ply construction substantially identical to the layer 13 except that it may of course be of a different total thickness. It will be observed that the gas-impervious layers I are in protected positions so that they cannot be abraded and at the same time are prevented from chemically reacting with metals and other materials. Inasmuch as the base layers B are generally of a thermoplastic, heat-sealable material, they can be readily heat sealed one to the other.

Figure 3:
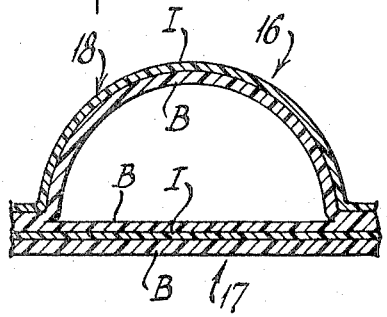
FIG. 3 is a cross-sectional view of still another embodiment of the invention utilizing the combination of a two-ply and three-ply laminate.

FIG. 3 is a cross-sectional view of a cellular material similar to that illustrated in FIGS. 1 and 2 but utilizing an embossed two-ply layer 16 sealed to a three-ply layer 17. The base materials B and the coatings I in this embodiment of the invention correspond to the coatings I and base materials B as described in connection with FIGS. 1 and 2. Since the three-ply layer 17 has the base material on the outer surface thereof, the base material B of the layer 16 is positioned on the inside of the embossment 18 to facilitate sealing of the layer 17 by a heat sealing process or the like. The structure shown in FIG. 4 is similar to that illustrated in FIG. 3 in that the layer 17 is embossed while the layer 16 functions as the sealing layer for the air cell.

Figure 4:
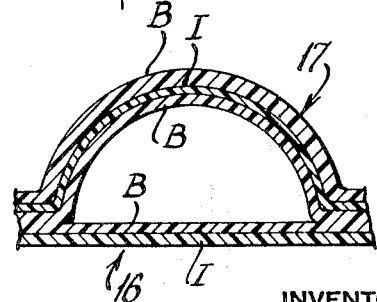
FIG. 4 is a cross-sectional view of a still further embodiment of the invention utilizing a two-ply and a three-ply laminate.

Sealing of the layers of laminated plastic material as illustrated in FIGS. 1 to 4 may be accomplished in a variety of ways. In FIG. 1, when the gas-impervious material I contains polyvinylidene chloride or other similar material, sealing can be accomplished by heating the coating and then rapidly cooling it to transform it into an amorphous state whereupon the sealing of the cells may be readily accomplished by bringing the two amorphic coatings into contact one with the other. In the case of FIGS. 2 through 4, if the base materials do not have an amorphous state, then they may be sealed by a heat sealing process or other suitable means to provide a hermetic seal.

While only certain embodiments of the invention have been illustrated and described, it is apparent that alterations, modifications and changes may be made without departing

I claim:

1. A cellular product comprising first and second coated layers each having a sheet formed of a heat-sealable thermoplastic material selected from the group consisting of polyethylene, polyvinyl chloride, polypropylene, nylon, cellulose acetate, polystyrene, and any copolymers and materials having similar heat-sealable characteristics and a coating on said sheet and formed of a gas-impervious material selected from the group consisting of polyvinylidene chloride and vinylidene chloride copolymers, said first coated layer having a plurality of closely spaced embossments formed by heating said first coated layer, said embossments extending from the uncoated surface of said first coated layer, said second coated layer being bonded to said first coated layer about the unembossed portions thereof to seal said embossments with the uncoated surface of said second coated layer being exposed, said embossments each forming a closed air cell.

2. A cellular product according to claim 1 wherein at least one of said sheets has plural preformed layers heat-sealed together with said gas-impervious material interposed therebetween.

* * * * *